United States Patent [19]
Libertiny

[11] 3,879,995
[45] Apr. 29, 1975

[54] STRAIN GAGE TRANSDUCER

[75] Inventor: George Z. Libertiny, Dearborn, Mich.

[73] Assignee: Ford Motor Company, Dearborn, Mich.

[22] Filed: May 13, 1974

[21] Appl. No.: 469,580

[52] U.S. Cl................................. 73/133 R; 73/146
[51] Int. Cl. .............................................. G01l 5/16
[58] Field of Search............... 73/133 R, 141 A, 146

[56] References Cited
UNITED STATES PATENTS

| | | | |
|---|---|---|---|
| 3,427,875 | 2/1969 | Saxl | 73/141 A |
| 3,771,359 | 11/1973 | Shoberg | 73/141 A |
| 3,780,573 | 12/1973 | Reus | 73/146 |

*Primary Examiner*—Charles A. Ruehl
*Attorney, Agent, or Firm*—Robert W. Brown; Keith L. Zerschling

[57] ABSTRACT

A strain gage transducer suitable for use in the measurement of forces along three orthogonal axes and moments about two of these axes. The transducer includes a substantially square plate. The center of the square plate is located at the intersection of two imaginary diagonal lines drawn between oopposite corners of the square plate. The plater has four openings equidistantly located from the center of the square plate, and each of the openings is located between the center and a corner of the plate. The openings each are symmetrical with respect to one of the diagonal lines and are formed from two circular holes interconnected by an open slot. The square plate has eight preferably arcuate grooves on each of its square surfaces, each of these grooves extending from an edge of the plate to one of the openings. Also, two preferably arcuate grooves are provided on each edge of the square plate, each of the two arcuate grooves interconnecting a groove on one of the square surfaces of the plate with a groove on the opposite square surface. Strain gage means are provided for measuring tension and compression forces in each of the grooves and circular holes. The strain gage transducer is particularly suitable for use in measuring the three forces and two moments acting upon a spindle in a vehicle wheel assembly.

9 Claims, 10 Drawing Figures

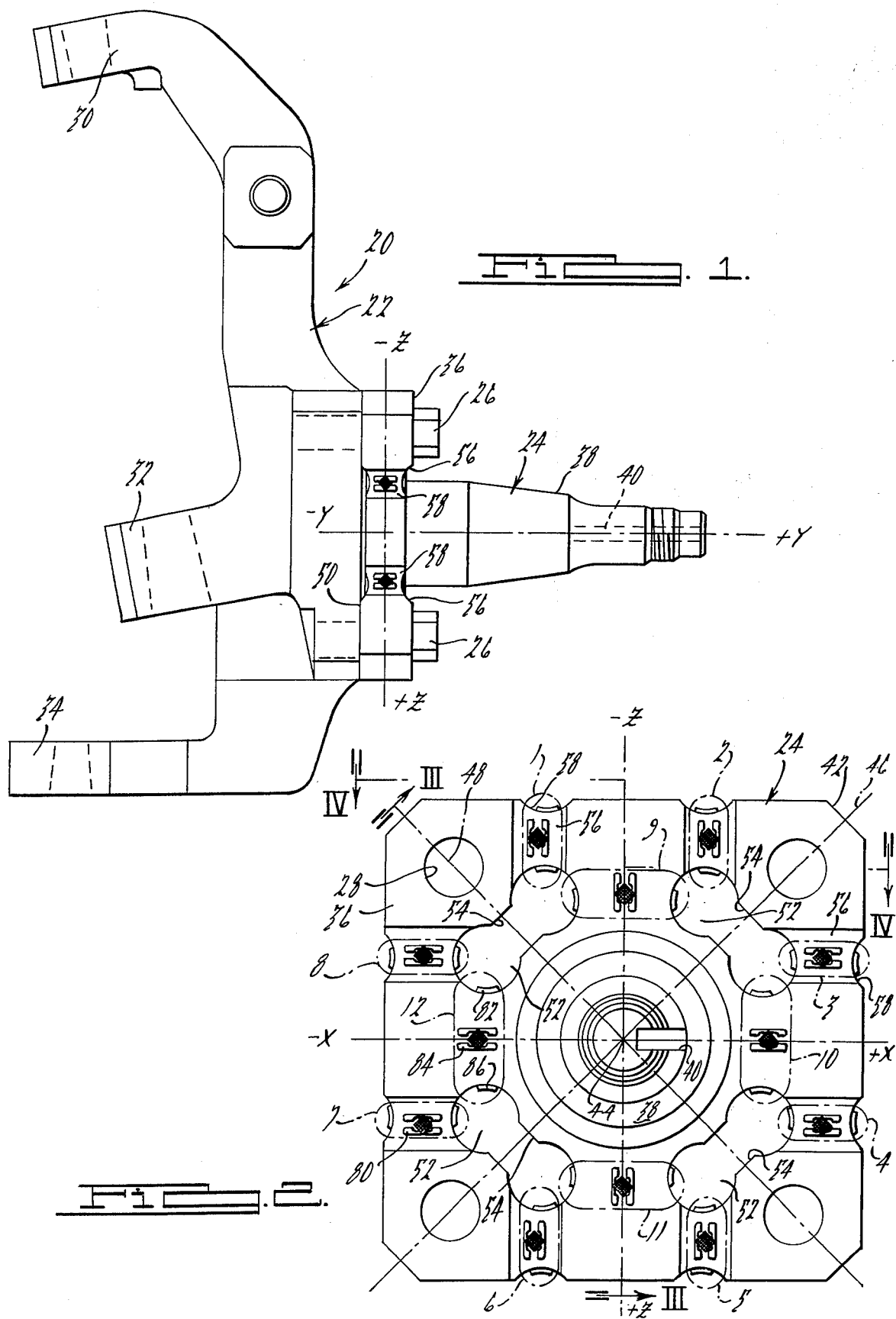

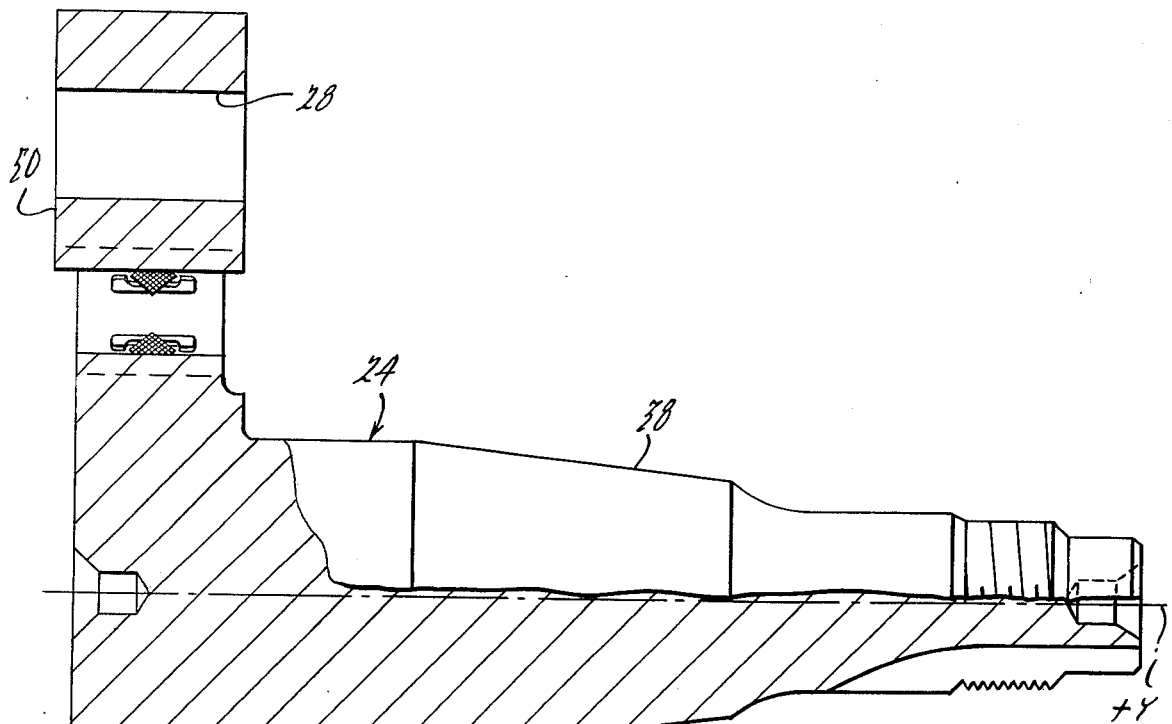
FIG. 3.
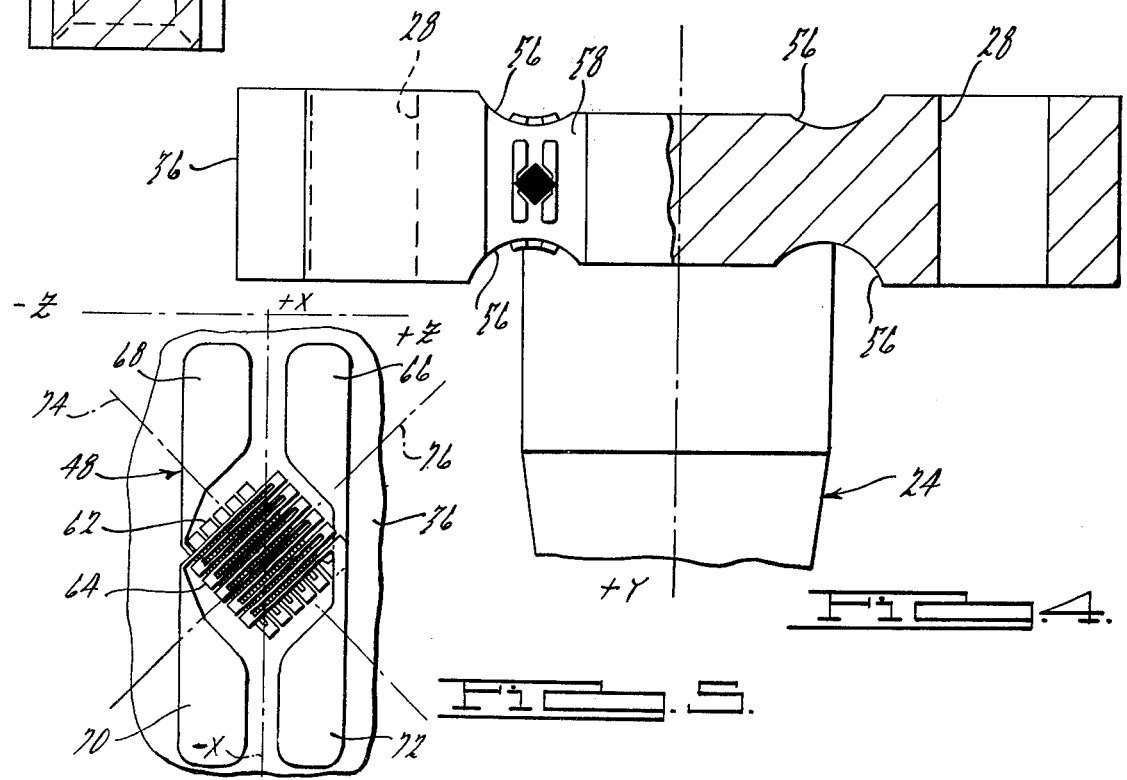
FIG. 4.
FIG. 5.

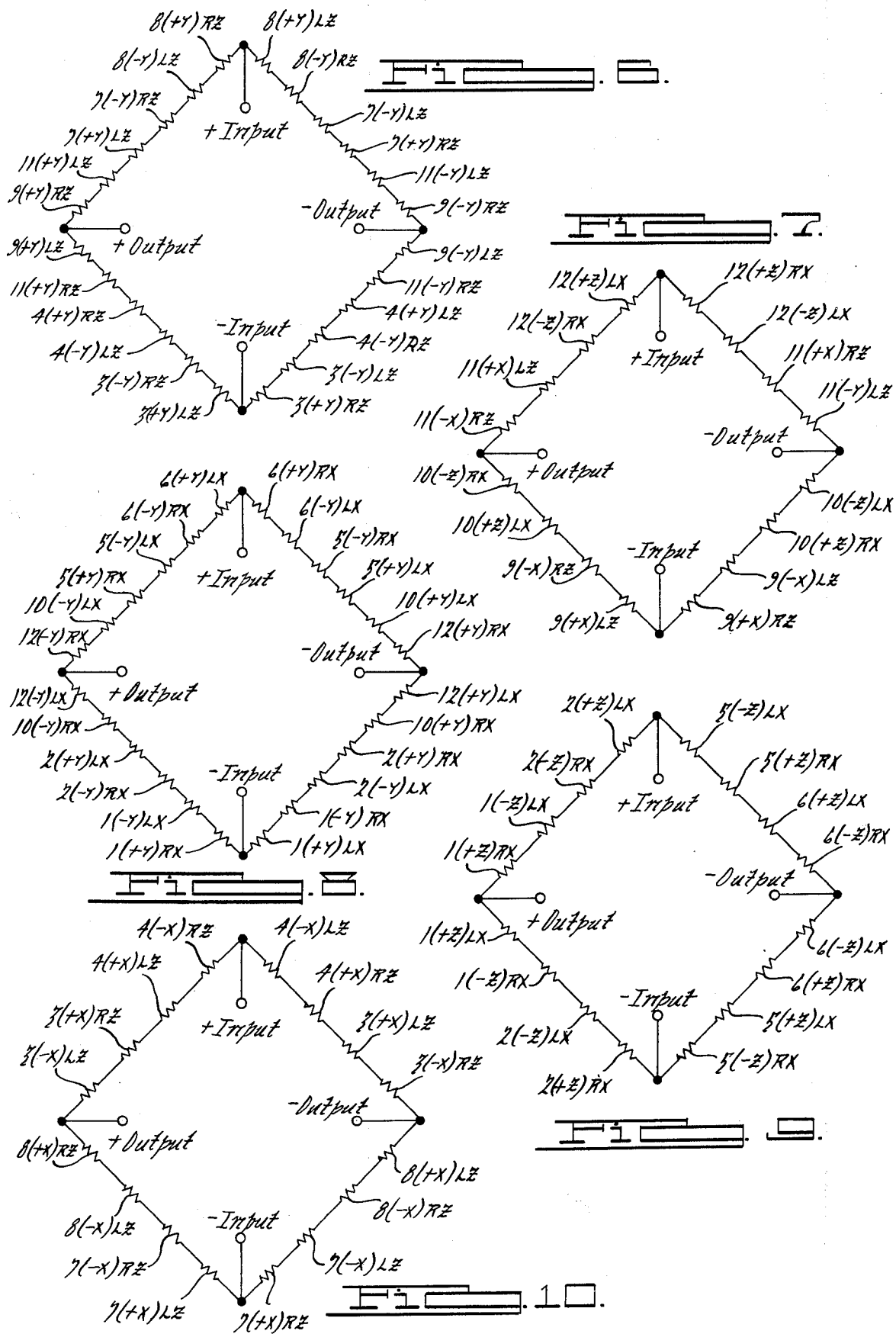

3,879,995

STRAIN GAGE TRANSDUCER

BACKGROUND

This invention relates to a strain gage transducer for the measurement of a plurality of forces and moments acting upon the transducer. More particularly, the invention relates to a transducer utilizing strain gages to measure the forces acting along three orthogonal axes and the moments about two of these axes. In the preferred form of the invention, the transducer itself comprises a spindle on which the wheel of a motor vehicle rotates. Thus, the transducer senses and measures forces acting on the spindle of a vehicle wheel assembly and measures moments about two axes perpendicular to one another and perpendicular to the axes of the spindle.

In its preferred form, the transducer of the invention is suitable for measuring three forces and two moments acting on the front suspension spindle of a motor vehicle. The transducer is very small in comparison with prior art transducers capable of measuring forces along three axes and can be used to measure such forces and moments without any major modifications of the vehicle suspension system. Also, the transducer may have an accuracy on the order of plus or minus two percent and "cross talk" between the electrical circuits used to measure the forces and moments is minimized.

SUMMARY OF THE INVENTION

A transducer suitable for use in the strain-gage measurement of a plurality of forces and moments acting upon the transducer comprises a substantially square plate having a center located at the intersection of two imaginary diagonal lines drawn between its opposite corners. The square plate has four openings equidistantly located from the center of the square plate, and each of the openings is located between the center and a corner of the square plate. These openings each are symmetrical with respect to one of the diagonal lines and are formed from two circular holes located on opposite sides of the diagonal line of symmetry. The circular holes in each of the openings are interconnected by an open slot.

The square plate necessarily has two square surfaces. Each of these square surfaces has eight grooves each of which extends from an edge of the square plate to one of the circular holes. Also, the square plate has two grooves on each of its four edges which grooves interconnect a groove on one of the square surfaces with a groove on the opposite square surface. Strain gage means are provided for measuring tension and compression forces in each of the grooves and circular holes and also at locations on the square surfaces. The strain gages, preferably 96 in number, are electrically connected in five bridge circuits. Three of the bridge circuits provide electrical signals representative of the magnitudes of forces acting along three orthogonal axes of the transducer, and the remaining two bridge circuits provide electrical signals representative of the magnitude of moments about two of the three axes.

The invention may be better understood by reference to the detailed description which follows and to the drawings.

BRIEF DESCRIPTION OF THE DRAWINGS

FIG. 1 is a full scale drawing of a spindle transducer assembly for the right-hand front wheel of a motor vehicle;

FIG. 2 is a full scale side elevational view of the spindle transducer shown in the assembly view of FIG. 1;

FIG. 3 is a double scale sectional view taken along the line III—III in FIG. 2;

FIG. 4 is a partial double scale section view taken along the line IV—IV in FIG. 2;

FIG. 5 is a greatly enlarged view of a pair of strain gages arranged in a stacked rosette, and FIGS. 6 through 10 show the strain gages arranged in five electrical bridge circuits.

DETAILED DESCRIPTION

With reference now to the drawings, wherein like numerals refer to like parts in the several views, and with particular reference to FIG. 1, there is shown a spindle assembly, generally designated by the numeral 20. The spindle assembly 20 as depicted is designed for utilization as part of the wheel suspension assembly for the right-hand front steerable wheel of a conventional rear wheel drive motor vehicle. The spindle assembly 20 differs from a conventional vehicle front wheel spindle in that, rather than being formed from a single part, it consists of two parts, a spindle adapter 22 and a spindle transducer 24. Bolts 26, which pass through holes 28 (FIG. 2) in the spindle transducer, secure the spindle transducer 24 to the spindle adapter 22. The spindle adapter 22 has a portion 30 which forms a part of the ball joint connection of the adapter to the upper arm of a vehicle suspension system, and has a lower portion 32 which forms a part of a ball joint connection to a lower arm of such suspension system. A portion 34 of the spindle adapter may be connected to a steering linkage.

Two imaginary axes are shown on the spindle transducer 24. The +Z axis is directed downwardly, that is, toward the ground when the spindle assembly 20 is mounted on the vehicle, and the −Z axis is directed vertically upward. The Y axis is horizontal and perpendicular to the Z axis. The spindle transducer 24 preferably is formed from a single piece of heat-treated H steel (high strength tool steel), and it consists of a substantially square baseplate portion 36 and an integral spindle portion 38 adapted to receive the wheel of a motor vehicle for rotation about the spindle 38. Of course, the wheel would rotate on conventional bearings or the like. The Y axis of the spindle transducer 24 is the axis of the spindle portion 38 and its positive direction is toward the end of the spindle portion 38 and away from the vehicle.

With particular reference now to FIG. 2, the X axis is shown perpendicular to both the Y and Z axis. The +X axis is directed toward the front of the vehicle, and, thus, the three axes, X, Y and Z form a right-hand orthogonal coordinate system. A keyway 40 in the spindle 38 is used to orient the spindle transducer 24 on the +X axis. The baseplate 36 is square in shape, except that its corners have been cut off as indicated at 42. The center 44 of the baseplate is located at the intersection formed between imaginary diagonal lines 46 and 48 extending, respectively, between opposite corners of the square baseplate.

Necessarily, the square baseplate 36 has two square surface areas, that is, the front surface area shown in elevation in FIG. 2 and from which the spindle 38 extends and the surface area on the back side of the spindle transducer 24, this back side surface being designated by the numeral 50 in FIGS. 1 and 3.

The square baseplate portion 36 has four openings 52 extending through it. Each of the openings 52 is formed from two circular holes, symmetrically located with respect to one of the diagonal lines 46 or 48, and the circular holes are interconnected by an open slot 54. On each of the square surface areas of the baseplate portion 36, there are eight preferably arcuate grooves 56 each extending between one of the edges of the baseplate 36 and one of the circular holes through it. Each of the edge surfaces of the square baseplate 36 has two preferably arcuate grooves each of which interconnects an arcuate groove 56 on one of the square surface areas with an arcuate groove 56 on the opposite square area. Otherwise stated, each of the grooves 58 interconnects one of the grooves 56 on the front side of the square baseplate 36 with a groove 56 on the back side of the square baseplate, as may be seen in FIG. 3 where the groove 58 is shown interconnecting the grooves 56 on the front and back sides of the square baseplate 36 of the spindle transducer 24.

With particular reference now to FIG. 5, there is shown a strain gage rosette 84 located on the square baseplate 36. The strain gage rosette includes a strain gage 62 and a second strain gage 64. The strain gages 62 and 64 overlap one another with the strain gage 64 being positioned on top of the strain gage 62. The two strain gages are positioned with their strain-sensing directions 90 degrees apart. The strain gage 62 has tab leads 66 and 68 connected to its opposite ends, and the strain gage 64 has tab leads 70 and 72 connected to its opposite ends. Axis 74 indicates the sensing direction for the strain gage 62 and axis 76 indicates the sensing direction for the strain gage 64. Pairs of strain gages as illustrated in FIG. 5 are positioned at 48 locations on the square baseplate 36. Thus, there are a total of 96 strain gages. When positioned on the baseplate, the axes 74 and 76 always are located at a 45 degree angle with respect to one of the coordinate axes X, Y or Z.

Strain gage rosettes such as illustrated in FIG. 5, are commercially available from Micro-Measurements Division, Vishay Intertechnology Inc., 38,905 Base Road, Romulus, Mich. In the strain gage transducer shown in the drawings, it is preferred that Micro-Measurements type SA-06-125TR-350, option B175, strain gage rosettes be utilized in the transducer. Forty-eight strain gage rosettes, each containing two strain gages at 90° angles with respect to one another, are utilized in the spindle transducer 24. The strain gage rosettes may be installed on the square baseplate 36 with Micro-Measurements M-Bond 610 adhesive. Special fixtures, including circular pins inserted in the circular holes in the openings 52 and in the grooves 56 and 58, may be utilized to position the strain gage rosettes at the center of each gaged section. Copper lead wires (not shown) may be soldered to the tab leads of each of the strain gages to provide connections in strain gage bridge circuits.

In FIG. 2, 12 areas indicated by dot-dash lines numbered 1 through 12 are shown. Each of these 12 areas contains four rosette-pairs of strain gages, three of which may be seen in FIG. 2 and the fourth of which is located on the back side 50 of the square baseplate 36. Thus, in the area 12, three strain gage rosettes 82, 84 and 86 may be seen. Strain gage rosette 84 is shown in plan view and rosettes 82 and 86 are shown in edge view. Another strain gage rosette is located on the back side of the square baseplate 36 directly beneath the strain gage rosette 84. Thus, within the area 12, there are four strain gage rosettes each having a pair of strain gages constructed as shown in FIG. 5, this making a total of 8 strain gages in the area 12. Since there are 12 areas numbered 1 through 12, it is clear that there are a total of 8 times 12 or 96 strain gages in the spindle transducer 24.

The strain gage 84 in FIG. 5 is the strain gage 84 located in area 12 of FIG. 2. In order to understand the interconnections in the electrical bridge circuits shown in FIGS. 6 through 10, it is necessary to provide some means for indicating where in the various circuits the individual strain gages are connected and how they are oriented relative to the X, Y and Z axes of the spindle transducer 24. Thus, with particular reference to FIG. 5, it may be seen that the strain gages 62 and 64 comprising the strain gage rosette 84 are oriented, respectively, such that the axis 74 of the strain gage 62 is at 45° relative to the Z axis and that the axis 76 of the strain gage 64 also is oriented at 45° relative to the Z axis. The strain gage rosette 84 is observed, as viewed in FIGS. 2 and 5, in a direction looking toward the −Y axis. If the Z axis were to be rotated in a clockwise or right-hand direction about the point of intersection of the Z axis and the axis 74 of the strain gage 62, then the Z axis would coincide with the axis 74 of this gage. Similarly, if the Z axis were to be rotated in a counter-clockwise or left-hand direction about the point of intersection of the Z axis and the axis 76 of the strain gage 64, then the Z axis would coincide with the axis 74 of this gage. Thus, the strain gage 62 may be designated by the letters RZ to indicate the relationship of its axis 74 with respect to the Z axis. The strain gage 64 may be identified by the letters LZ to indicate the relationship of its axis with respect to the Z axis. The strain gages 62 and 64 are observed looking toward the −Y axis and are located in the area 12. Thus, a total designation for the strain gage 62 would be 12(−Y)RZ to indicate that it is located in area 12, observed looking toward the −Y axis and that it has its axis 74 oriented to the right of the Z axis of the spindle transducer 24. Similarly, the strain gage 64 may be designated 12(−Y)LZ. The two strain gages of the strain gage rosette 82 in area 12 would be designated 12(+Z)RX and 12(+Z)LX.

Designations for the various strain gages, similar to those discussed in the preceding paragraph, are used for the schematic electrical bridge circuit diagrams shown in FIGS. 6 through 10. FIG. 6 shows a bridge circuit having plus and minus DC voltage input terminals and plus and minus output terminals. This bridge circuit is used to produce an electrical signal representative of the forces acting upon the spindle transducer 24 along the X axis. The bridge circuit of FIG. 7 is used to provide an electrical signal indicative of the forces acting upon the spindle transducer along the Y axis. The bridge circuit of FIG. 8 provides an electrical signal representative of forces acting along the Z axis. The bridge circuit of FIG. 9 is used to provide an electrical signal indicative of moments acting about the X axis, and the bridge circuit of FIG. 10 provides an electrical signal representative of the moments acting about the Z axis of the spindle transducer 24.

Based upon the foregoing description of the invention, what is claimed is:

1. A transducer suitable for use in the strain-gage measurement of a plurality of forces and moments acting upon the transducer, said transducer comprising: a substantially square baseplate, the center of said baseplate being located at the intersection of two imaginary diagonal lines drawn between opposite corners of the baseplate, said baseplate having four openings equidistantly located from the center of said baseplate, each of said openings being located between said center and a corner of said baseplate, being symmetrical with respect to one of said diagonal lines, and being formed by two circular holes located on opposite sides of one of said diagonal lines, said circular holes being interconnected by an open slot, said circular holes and slot extending through said baseplate, said baseplate having eight grooves on each of its square surface areas, each of said eight grooves extending from an edge of said plate to one of said circular holes, and said baseplate having two grooves on each of its four edges, each of said two grooves interconnecting a groove on one of said square surface areas with a groove on the opposite square surface area, and strain gage means for measuring tension and compression forces in each of said grooves and circular holes and at locations on said square surface areas.

2. A transducer according to claim 1, wherein said strain gage means comprises a pair of strain gages located in each of said grooves, two pairs of strain gages located in each of said circular openings, and a pair of strain gages located between each of said openings on both square surface areas of said baseplate.

3. A transducer according to claim 2, wherein each of said strain gages has its sensing-direction axis positioned at an angle of about 45 degrees with respect to either an edge or square surface area of said baseplate.

4. A transducer according to claim 3, wherein the strain gages of each pair of strain gages overlap one another, and wherein all of said grooves are arcuate.

5. A transducer according to claim 2, wherein each of said strain gages is responsive to tension or compression forces acting at an angle of 45° with respect to either an edge or square surface area of said baseplate.

6. A transducer according to claim 2, wherein said strain gages are electrically connected in five bridge circuits, said bridge circuits collectively providing electrical signals indicative of forces acting upon said transducer along three orthogonal axes and electrical signals indicative of moments about two of said axes.

7. A transducer according to claim 2, wherein said transducer further includes a spindle having an axis extending from said center of said plate and in a direction perpendicular to said square surfaces, and wherein said strain gages are electrically connected in five bridge circuits providing electrical signals indicative of forces acting upon said transducer along three orthogonal axes, where said spindle axis is one of said orthogonal axes, and said bridge circuits providing electrical signals indicative of moments acting about the two axes, neither of which is said spindle axis.

8. A transducer according to claim 1, wherein said transducer further includes a spindle having an axis extending from said center of said square plate and in a direction perpendicular to said square surface areas, said spindle being adapted to receive a member to be rotated about said spindle axis.

9. A transducer according to claim 8, wherein said transducer forms a part of a spindle assembly for attachment to the suspension system for a wheel of a motor vehicle.

\* \* \* \* \*